United States Patent [19]

Taylor

[11] Patent Number: 4,564,002
[45] Date of Patent: Jan. 14, 1986

[54] SOLAR ENERGY COLLECTING SYSTEM

[76] Inventor: Lawrence H. Taylor, Box 49-58, 48 P.O. Branch, Union City, N.J. 07087

[21] Appl. No.: 644,455

[22] Filed: Aug. 27, 1984

[51] Int. Cl.$^4$ .................................................. F24J 2/00
[52] U.S. Cl. ........................................ 126/417; 126/431; 126/428; 126/450
[58] Field of Search ............... 126/450, 417, 431, 429, 126/428

[56] References Cited

U.S. PATENT DOCUMENTS

| | | | |
|---|---|---|---|
| 3,935,897 | 2/1976 | Pulver | 126/428 X |
| 4,069,809 | 1/1978 | Strand | 126/431 |
| 4,207,865 | 6/1980 | Allen | 126/431 |
| 4,337,754 | 7/1982 | Conger | 126/431 X |

*Primary Examiner*—Larry Jones
*Attorney, Agent, or Firm*—Kerkam, Stowell Kondracki & Clarke

[57] ABSTRACT

A solar energy collecting system for a building structure having a south facing wall and a roof structure including upper and lower solar panels of rectangular configuration having top, bottom and side edges disposed one over another. The lower of the solar panels are mounted with their bottom edges parallel to the ground line of the south facing wall with the major axes thereof extending east and west and the minor axes positioned at an angle of about 70° to the horizontal. The upper panel is also mounted with the major axis extending in an east and west direction and the minor axis positioned at an angle of about 50° to the horizontal. With this arrangement of the panels, maximum effective winter sunlight reaches the panels as the plane of their collector surface is substantially perpendicular to the line of the sun's rays whereas, in the summer time, the uppermost panel receives much less heat than if it were perpendicular to the sun's rays. The bottom panels act more as an insulator for the wall of the building than a collector, having only a 15 to 90 ratio of effectiveness and the sun's rays, at those seasons when the lower panels are not fully shielded, coming in at a slant and are much more reflective in pattern.

5 Claims, 2 Drawing Figures

SOLAR ENERGY COLLECTING SYSTEM

BACKGROUND OF THE INVENTION

It is customary to place solar panels of solar systems on roofs of buildings that they serve. It is also desirable to design the sun receiving portions of a building in such a way that the solar collector panels function differently from season to season to most effectively serve the varying seasonal energy absorbing and/or insulating requirements of the building.

It is known that the winter sun rises at its zenith to a lower angle than during any other period of the year (30° in the sun belt); yet it is during the winter season that Solar heating systems must produce the maximum heat possible for the capacity of the system.

It is also known that Solar panels are most efficient as collectors when the plane of their insolation surface is substantially within 10° of being perpendicular to the line of the sun's rays.

It is apparent, therefore, the south facing back wall of a conventional house receives more winter insolation than the shallow pitch roof of a conventional house because the back wall of the house is more perpendicular to the line of the sun's rays than the roof.

For the designer of a Solar system, it becomes especially evident that collector panels on the south wall and south facing roof must be positioned with care, to make optimum use of winter sun and least use of excess summary solar radiation, while as much as possible accommodating the objectives of desirable house design, such as having back windows to permit outward view and inward light.

SUMMARY OF THE INVENTION

To accommodate the various objectives of the present invention and still retain practical house design, I have conceived and successfully tested a solar energy collecting system for a building structure having a south facing wall, a back wall and a roof structure which generally includes upper and lower solar collector panels of rectangular configuration having top, bottom and side edges. The lower solar panels are mounted with the bottom edges of the panels running generally along the ground line of the south facing wall of the structure with the major axes thereof extending east and west and the minor axes positioned at an angle of about 70° to the horizontal. The lower panels being more upright are more appropriate for the back wall of a house both from appearance and function. The upper solar panel is mounted above the lower solar panels a distance sufficient to provide a window if desired between the top edge of the lower panels and the bottom edge of the upper panel, though this window space is not essential. The upper panel is, like the lower panels, mounted with the major axis extending in an east-west direction and the minor axis positioned with a flatter angle of about 50° to the horizontal. With this arrangement of the panels, the maximum effective winter sunlight reaches the panels in the winter when the heat is most needed whereas. In the summertime, when the sun is overhead at an angle of 85° elevation, the uppermost panel due to the 50° to 85° difference in sun line receives a much reduced portion of the solar energy, and a portion of the lower solar panels due to the designed overhang will be shaded by the upper panel. Though this "summer overhang" principle is known in house design to prevent summer sun from entering a house and permitting winter penetration, the use of the overhanging shade principle for solar collector panels is novel.

BRIEF DESCRIPTION OF THE DRAWING

The invention will be further described in reference to the accompanying drawing wherein.

DETAILED DESCRIPTION OF THE INVENTION

Figure 1:
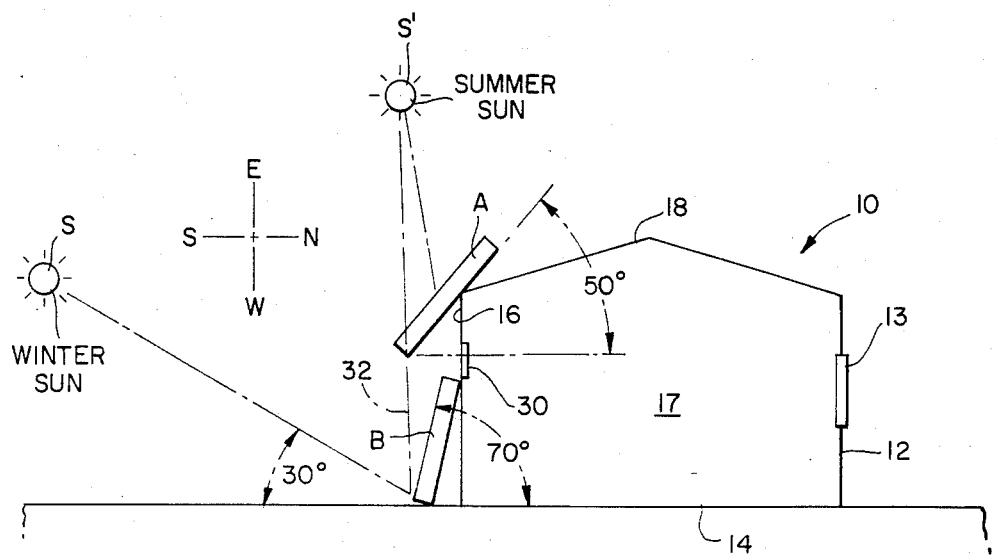
FIG. 1 is a diagrammatic view of a house having a backwall generally facing in a southernly direction.
Figure 2:
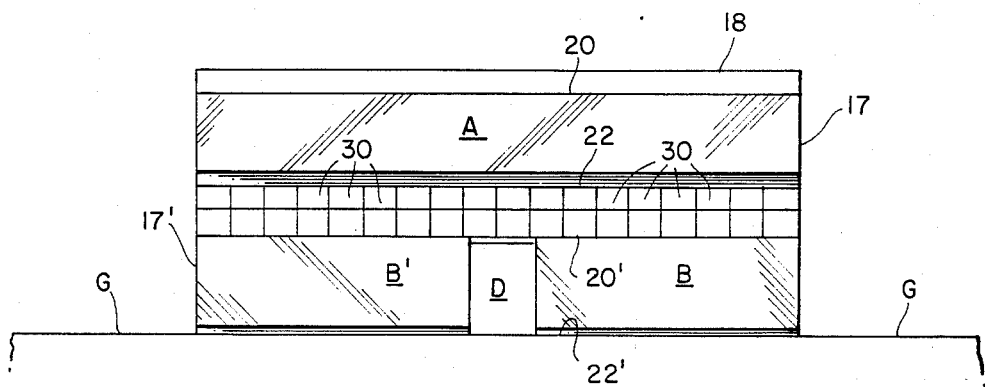
FIG. 2 is a view of the structure shown in FIG. 1 looking toward the back, south facing wall.

Referring now to the drawing, 10 generally designates a typical small, one story house having a front wall 12, a floor 14, a back wall 16 and walls 17 and 17' and a pitched roof structure 18. The front wall 12 has the usual windows 13 and entrances not shown. The back wall 16 is provided with solar panels designated A, B, and B' with the major axes thereof running in an east-west direction. Each of the panels A, B and B' are rectangular, and panel A has a top edge 20, a bottom edge 22 and side edges 24 and 26. Likewise, the panels B and B' have a top edge 20', a bottom edge 22' and side edges 24' and 26'.

Throughout the specification and claims, the term "solar panel" is intended to include various forms of solar energy converting and collecting devices well known in the art which may consist of a single unitary structure or a plurality of individual panel units formed into a panel structure.

In FIG. 1, there is illustrated the sun S and S' at altitudes of 30° and 85° to the horizontal representing the winter and summer solstices in the United States sun belt.

Panels B and B' are mounted with their lower edges 22' parallel to the ground line indicated by lines labeled G with their major axes extending in an east-west direction and their minor axes at an angle of about 70° to the horizontal. Panels B and B' are illustrated with a door D therebetween.

Panel A is mounted above Panels B and B' and spaced therefrom a distance to permit the inclusion of windows 30 between the top edges 20' of panels B and B' and the bottom edge 22 of panel A. Panel A has its major or long axis positioned in an east-west direction and the minor axis at an angle of about 50° to the horizontal. Thus, both panels A, B and B' are mounted so as to achieve the most effective but distinctly different compromises, in general terms, between summer and winter operating conditions.

Due to the fact that the winter sun angle is 30° to the horizontal, in the sun belt where solar housing is most effective, when the maximum heat efficiency is required, the panels are positioned at the complementary angle of 60° plus or minus 10° to be at the right angle and perpendicular to the sun's rays. Thus, the panels A, B and B' are set at angles of 50° and 70° respectively for the roof panel and the back wall panels. It may be seen from the drawing that the vertical relationship of the panels is such to cause summer shading but no winter shading.

While the optimum angle for the panels would be 60° (90°–30°) for panels B and B' and 50° for panel A, there is very little loss in efficiency when the panel is rotated 10° to either side of the 60° optimum angle, the top and bottom panels A, B and B' respectively have been rotated to 50° and 70° respectively to achieve certain desirable results, i.e., different summer and winter collecting capability.

It will be noted from FIG. 1 that, during the summer when generally less energy is reqired and the sun rays strike the panels during a longer period of time, panel A is so positioned that it is offset rearwardly relative to panels B and B' that panels B and B' are shaded by panel A during a portion of each day. This shading is illustrated by broken lines 32.

By using the plural panels A, B and B' versus a single panel for the back of a one story building, a number of additional advantages are achieved. Such advantages include:

1. By using plural panels versus one larger panel of greater height filled with liquid, it is possible to make the panels out of lighter gage material, as the hydrostatic pressure is much less in the smaller panels which can then be made less expensively. The use of smaller panels in vertical array also allows the insertion of a line of windows for the back of the house.
2. By using plural panels, it is also possible to place them with space in between for a most desirable window(s) and door in the back of the house.
3. By arranging the panels properly there will be many advantages possible for the summer, because when the summer sun reaches 85° elevation at southern U.S. latitudes, for example, the top panel can project out sufficiently to substantially shade the lower panels from the sun at the zenith which is, however, at such a high angle relative to the plane of the bottom panels that the panels at other seasons when not fully shielded by the top panel absorb very little heat, but rather act as a wall heat buffer instead. The roof panel in the summer is not at the optimum angle for maximum insolation, but the sun's rays are so hot that lower efficiency is not important and the top panel will produce all the heat required.

Having described my invention, what is claimed is:

1. Solar energy collecting system employing a multiplicity of specially positioned collector panels for a south facing wall and roof of a building structure comprising first and second solar panels, said first and second panel being connected to each other for fluid flow therethrough to form part of said system; each of the first and second solar panels being rectangular and having top, bottom and side edges; means mounting the first solar panel with the bottom edge paralleling the ground line of the south facing wall with the major axis of the panel extending east and west; the minor axis of said first panel being positioned at an angle of from about 60° to about 80° to the horizontal; said second solar panel mounted above said first solar panel with the bottom edge thereof spaced above the top edge of the said first solar panel; the major axis of said second solar panel extending east and west and the minor axis positioned at an angle of from about 40° to about 60° to the horizontal; whereby said first and second solar panels receive maximum effective winter sunlight and in summer said panels intercept substantially less solar rays; said solar energy collecting system further characterized in that the upper second solar panel projects outwardly of said first solar panel to thereby shade said first solar panel at high summer angles of the sun.

2. The solar energy collecting system as defined in claim 1 wherein the south facing wall of the building structure includes at least one window or line of windows running laterally between the upper edge of the first panel and the lower edge of the second panel.

3. The solar energy collecting system as defined in claim 1 wherein the first solar panel comprises a pair of panels separated by a door.

4. The solar collecting system as defined in claim 1 wherein the referenced panel tiers may be used in a multistory building to achieve the same objective.

5. The solar energy collecting system as defined in claim 1 wherein the first solar panel is mounted at an angle of 70° to the horizontal and said second solar panel is mounted at an angle of 50° to the horizontal.

* * * * *